United States Patent [19]

Rassieur et al.

[11] Patent Number: 5,401,218
[45] Date of Patent: Mar. 28, 1995

[54] OUTBOARD PLANETARY GEAR ASSEMBLY FOR TRACKED VEHICLES

[75] Inventors: Charles L. Rassieur, St. Louis, Mo.; Raymond W. Burns, Madison, Ill.

[73] Assignee: Central Mine Equipment Company, St. Louis, Mo.

[21] Appl. No.: 899,464

[22] Filed: Jun. 16, 1992

[51] Int. Cl.6 .................... F16H 1/38; B62D 11/02
[52] U.S. Cl. ............................ 475/18; 305/56; 305/57; 180/9.62; 74/606 R
[58] Field of Search .......... 74/606 R; 475/18, 346, 475/29; 305/56, 57; 180/9.62

[56] References Cited

U.S. PATENT DOCUMENTS

| | | | |
|---|---|---|---|
| 1,356,718 | 10/1920 | Holt | 475/29 X |
| 1,783,780 | 12/1930 | Evans | 475/18 X |
| 2,707,522 | 5/1955 | Sibley | 475/346 X |
| 3,872,939 | 3/1975 | Eckert | 74/606 R X |
| 4,131,169 | 12/1978 | Eickhoff et al. | 180/9.62 OR |
| 4,132,134 | 1/1979 | Avery et al. | 180/9.62 X |
| 4,795,222 | 1/1989 | Smith | 305/54 X |

*Primary Examiner*—Dirk Wright
*Assistant Examiner*—Daniel Wittels
*Attorney, Agent, or Firm*—Polster, Lieder Woodruff & Lucchesi

[57] ABSTRACT

A track vehicle drive train, with a differential and outboard planetary gears driven by the differential has an outboard planetary housing containing the planetary gears. The planetary housing has a drive ring integral with it and extending circumferentially around it, upon which an externally undular sprocket is mounted directly. The housing is bell-shaped, and provides within it space to accommodate larger gears than housing known heretofore, which permits higher reduction in the outboard planetaries, which allows a lower reduction in the differential than has been possible heretofore with a standard sized sprocket.

21 Claims, 3 Drawing Sheets

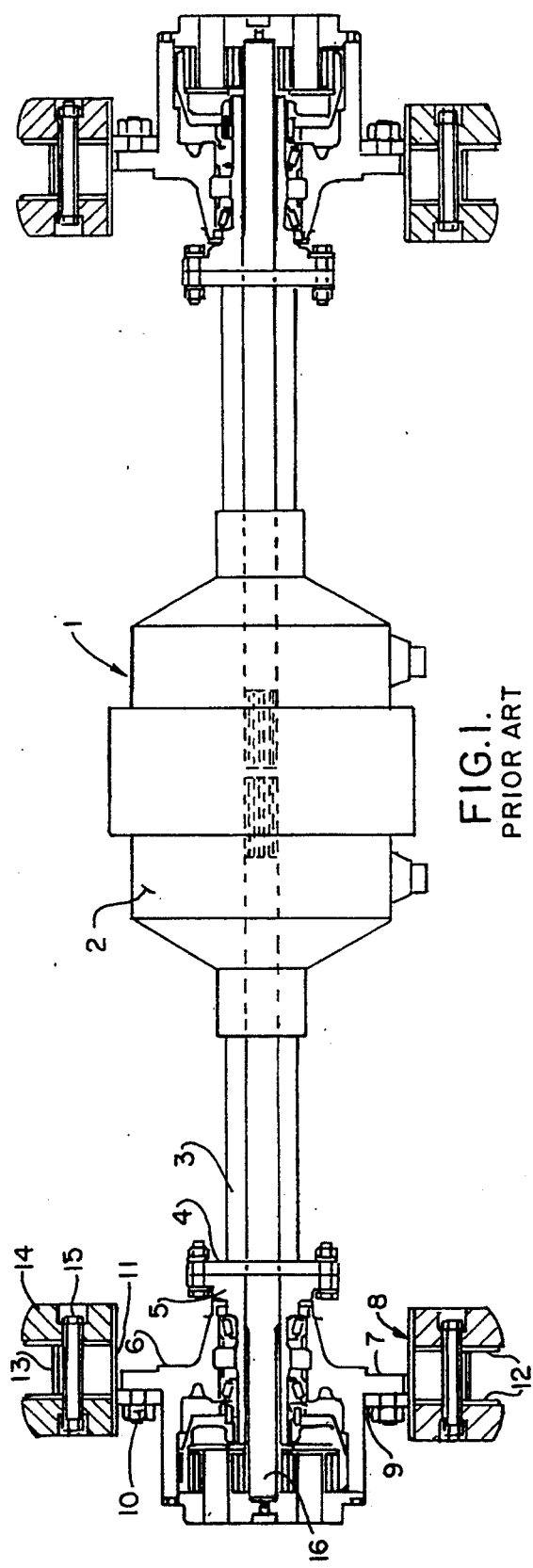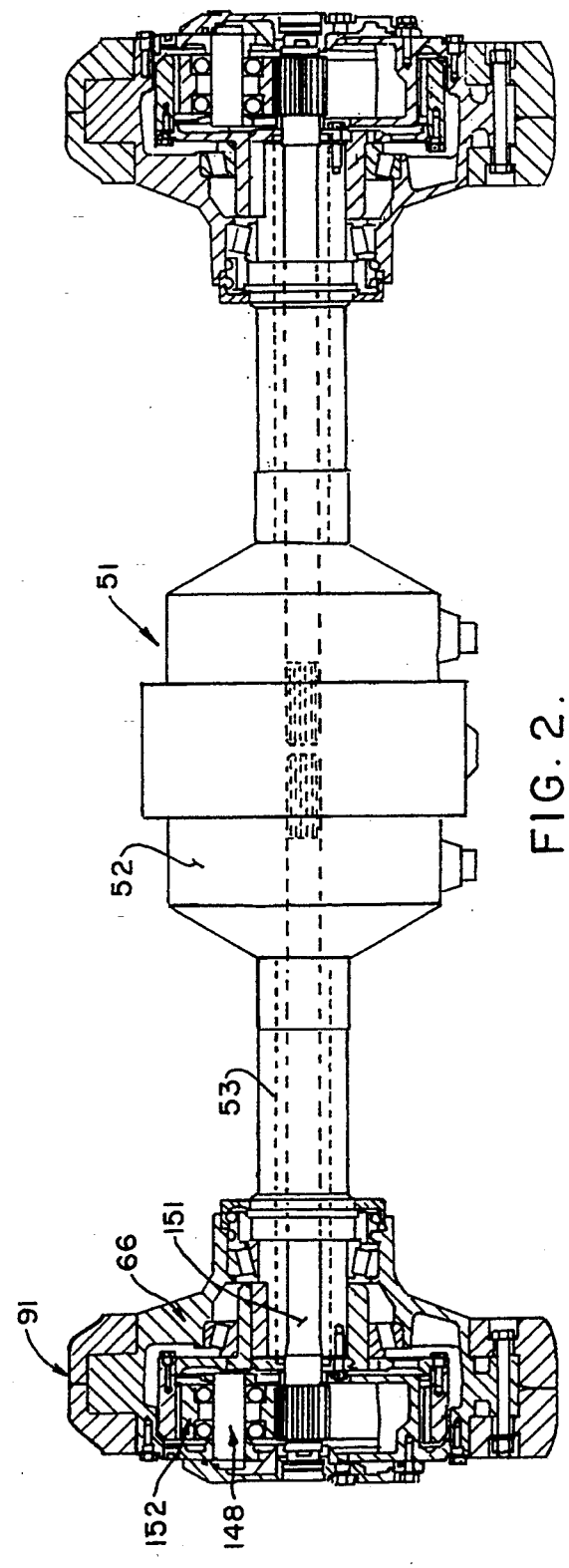

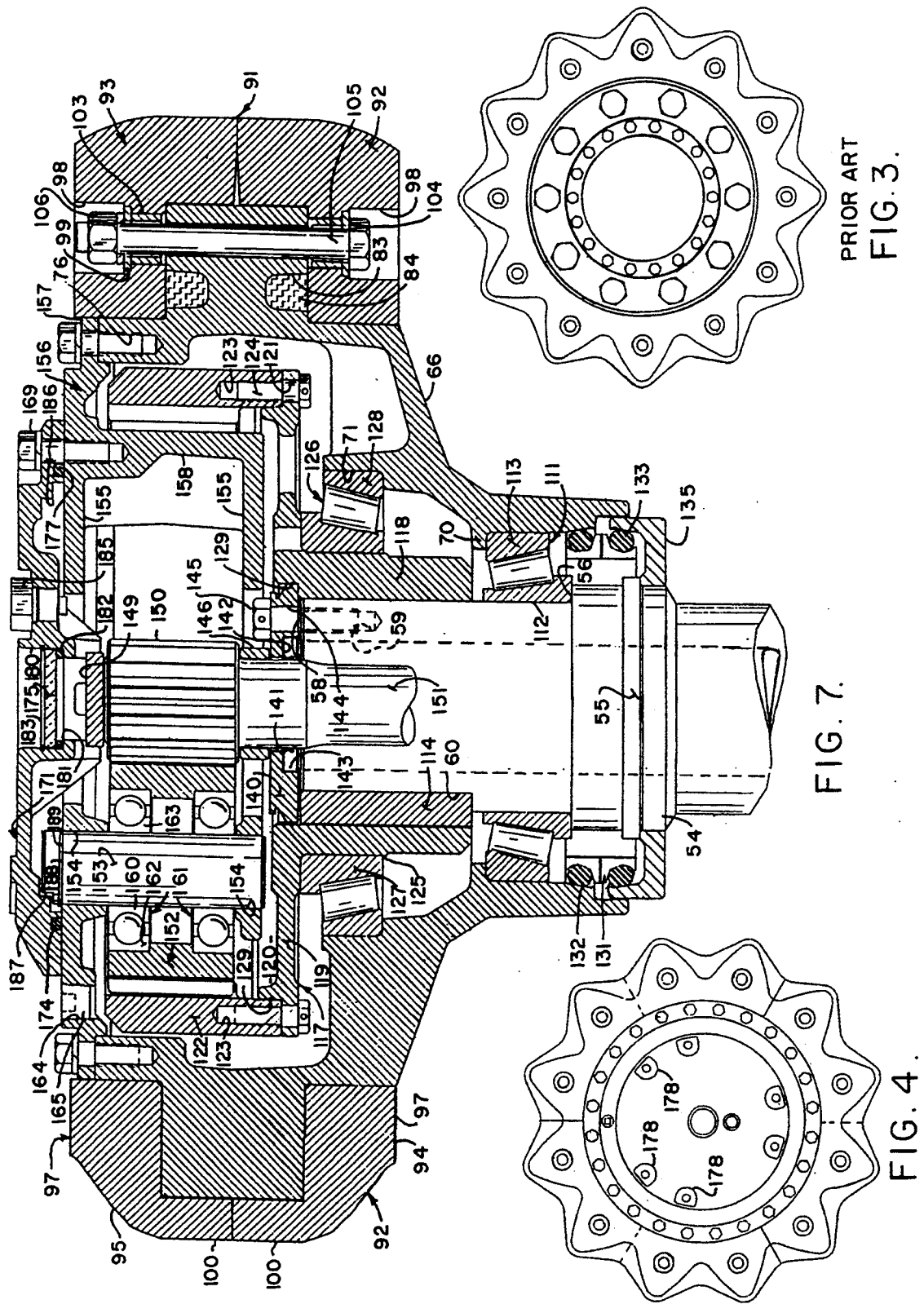

OUTBOARD PLANETARY GEAR ASSEMBLY FOR TRACKED VEHICLES

BACKGROUND OF THE INVENTION

This invention has to do primarily but not exclusively with drive trains for tracked vehicles, and has particular application to vehicles such as the ones shown and described in U.S. Pat. No. 4,795,222.

The conventional drive train of such tracked vehicles is illustrated in FIG. 1. As shown there, a drive train 1 includes a differential 2 from which a spline shaft 16 extends through a hollow spindle 3 that is fixed against rotation. The spindle 3 has a spindle flange 4 on it, to which a housing carrier 5 is bolted. A housing 6 is rotatably journaled on the housing carrier 5. A flange 7 projects radially outwardly from the housing, and has studs extending axially from it to which a sprocket mount 8 is attached by nuts 10, This is also shown in FIG. 3. The sprocket mount 8 includes a sprocket flange 9 through which the bolts extend, an annular base 11 secured to the flange 9, and spaced annular walls 12, between which cross bars 13 extend for reinforcement. The walls 12 are undular, as shown in FIG. 3. Urethane sprockets 14, which in the conventional drive are uninterrupted, are bolted to the two outwardly facing sides of the walls 12, as shown in FIG. 1, by means of bolts 15.

It can be seen by comparing FIG. 1 of the present application with FIG. 1 of Pat. No. 4,795,222, that the track extends in both directions transversely of the sprockets, and that the sprocket engages grouser bars of the track. In the conventional construction described, this permits rocks and earth to accumulate between the track and the housing, which projects a substantial distance beyond the outboard side of the sprocket. The construction of the sprocket itself, with two spaced sections and a substantial gap between them, makes for rapid wear, which permits the steel walls 12 to engage the grouser bars, thus causing the grouser bars to fail. Rocks and debris get between the gear shaped metal surfaces and the track, sometimes causing bending and failure of the metal drive sprocket. The internal dimensions of the housing severely limit the amount of reduction that can be obtained in the outboard planetaries, and also limits the strength of the various gears. When the amount of reduction of the planetaries is low, more reduction is required in the differential, which makes braking and steering more difficult and increases the strain, hence the wear and tear, on the components of the drive system. The sun gear is conventionally splined or keyed to the end of the spline shaft. Also, conventionally, a threaded plug is provided in the cover of the housing, which has to be removed, and a dip stick or one's finger inserted, to determine the oil level in the housing. This discourages frequent checking, and leads to the provision of an inadequate amount of oil, and consequent damage to the gears.

BRIEF DESCRIPTION OF THE DRAWINGS

In the drawings, FIG. 1 is view, partly in section, of a drive train illustrating the prior art;

FIG. 2 is a view, partly in section, showing one embodiment of drive train of this invention;

FIG. 3 is a view in side elevation of a prior art sprocket and housing;

FIG. 4 is a view in side elevation of a drive sprocket and housing of this invention;

FIG. 7 is an enlarged sectional view, partly broken away, of the planetary gear and sprocket assembly of the device as shown in FIGS. 2 and 4.

DESCRIPTION OF THE PREFERRED EMBODIMENT

Figure 5:
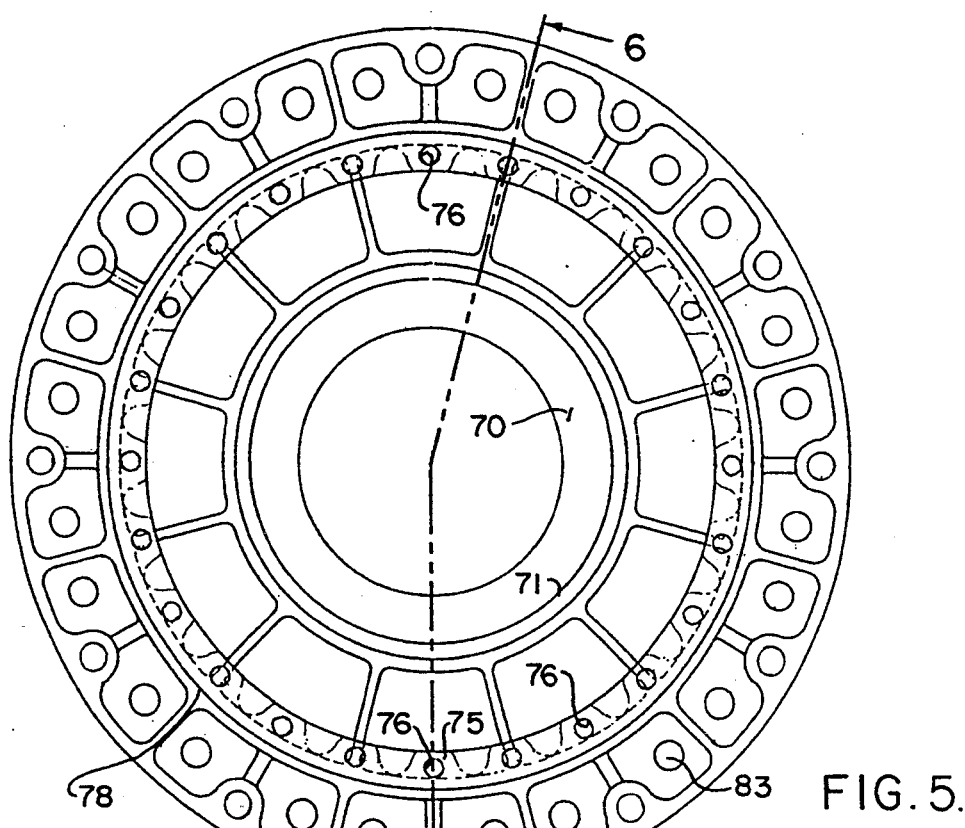
FIG. 5 is a view in front elevation of a planetary gear housing of this invention.

Referring now to FIG. 2, for one illustrative embodiment of this invention, reference numeral 51 indicates a drive train that includes a differential 52, a fixed hollow spindle 53, a bell-shaped housing 66, a spline shaft 151, a planetary gear assembly 148, and a sprocket 91.

The differential 52 is of conventional construction, except that the ratio of reduction is preferably less than 5, for reasons that will be explained. The spindle 53 is fixed to the differential case, which is also conventional. However, the spindle 53 is provided with a shoulder 54 with a cylindrical external surface, a land 55 projecting radially outwardly from the cylindrical surface of the shoulder 54, and a continuing cylindrical surface on the axially outboard side of the land 55, beyond which the diameter of the spindle is reduced to the size that it had axially inboardly of the shoulder 54, to define an annular shelf 56. The spindle, which has a heavy wall, has an external keyway 60 extending axially from an end surface 58, and a series of spaced, tapped, bolt-receiving holes 59 opening through the end surface.

Figure 6:
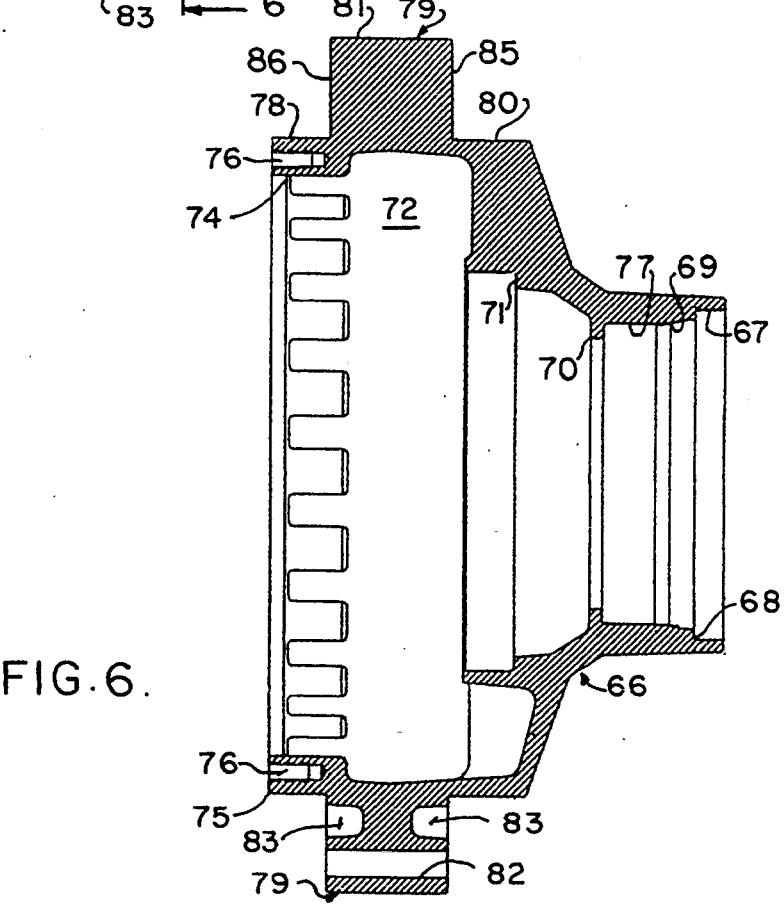
FIG. 6 is a sectional view taken along the line 6—6 of FIG. 5.

The housing 66 is a bell-shaped casting, as shown particularly in FIG. 6, open at both ends. An open axially inner end 67 is relatively small, as compared with its axially outer open mouth 74. In a direction axially outwardly from the differential, on the inside surface of the inner end 67 is a step 68, an inwardly convergently sloped section 69, a radially inwardly projecting annular rib 70, a radially outwardly flaring section, and a bearing seat 71. Between the axially outer end of the radially inwardly sloping section 69 and the annular rib 70, is a cylindrical surface 77. Axially outboardly of the bearing seat section 71, is a planetary gear cavity 72. In the embodiment shown, the walls defining the planetary gear cavity are heavily cored, as shown particularly in FIGS. 5 and 6, to reduce the weight of the housing casting. An axially outer radially flat faced end wall 75 has a series of uniformly spaced tapped holes 76 extending axially into it, as shown particularly in FIGS. 6 and 7.

On the external surface of housing 66, extending axially inwardly from the end wall 75, is an outer cylindrical area 78 from which projects an axially wide, cylindrical drive ring 79, an outer (peripheral) cylindrical surface 81 of which, in this embodiment, is uninterrupted. The surface 81 bridges between radially outer edges of an inboard radial surface 85 and an outboard radial surface 86 of the drive ring 79. On the axially inboard side of the drive ring 79 is another, inner, cylindrical surface 80. The drive ring is also cored out, as shown at 83 in FIGS. 5, 6 and 7, to form cavities which are filled with foamed plastic filler 84. Through-bolt holes 82 extend axially through the drive ring at spaced intervals.

The sprocket 91 is made up of an inner section 92 and an outer section 93. The inner section 92 is, in this embodiment, made up of three inner section segments 94;

the outer section 93 is made up of three outer section segments 95. Each of the segments spans 120°, and is made up of a radial wall 97 and a transverse tread wall 100, circular on its inside surface and undular on its outside surface. The radial wall 97 has stepped passages 98 in it, defining a seat 99 in each, to accommodate a bushing 103 and washer 104 by which the segments are mounted, by means of a bolt 105 and nut 106, to the drive ring 79. When the segments are mounted, they form an uninterrupted sprocket, the transverse tread walls of the two facing segments butting one another, as shown in FIGS. 2 and 7, and the ends of the segments of each section butting one another, as shown in FIG. 4. It will be observed that the butting ends are sloped so that the radially outer portion can be put under a compressive load to ensure a tight joint, through which rocks and the like have a hard time passing. Also as shown in FIG. 4, the segments of the inner section are staggered with respect to the segments of the outer section.

In the embodiment shown, which is the preferred embodiment, the assembled sprocket is a twelve-tooth, 4 15/16" pitch sprocket, which is a conventional standard size.

The planetary gear and housing assembly includes, beginning at the axially inboard end, a roller bearing 111, a cone 112 of which slidably embraces the cylindrical section of the spindle axially outboard of the shelf 56, and seats against that shelf, and a cup 113 that is interference fitted into the housing, in abutment with the axially inboard radial face of the rib 70. Axially inboard of the roller bearing 111, the open end 67 of the housing is closed around the spindle by a two part "cat" seal 131, on and around which O-rings 132 and 133 extend, the O-ring 132 bearing against the sloped section 69 of the inner wall of the housing, and the O-ring 133 bearing on an inner face of a seal cover 135. Axially outwardly of the rib 70, a ring gear support 117, with an axially extending cylindrical sleeve or hub 118 and a radially extending spider 119, is mounted on the spindle by means of a key 114 mounted in the keyway 60 in the spindle, and a complementary keyway in the inner face of the cylindrical sleeve 118. The sleeve 118 is counterbored to form a seat 129 to receive an annular retaining cap 140 with a central opening 141, surrounded on its axially inboard side by a seal seat 142 in which a seal 143 is seated, embracing a cylindrical surface of the spline shaft 151 immediately axially inboard of a sun gear 150 which, in this embodiment, is integral with the spline shaft 151. The retaining cap 140 is bolted to the end surface 58 of the spindle by bolts 145, threaded into bolt holes 59 through complementary holes 144 in the cap.

The ring gear support spider 119 has a continuous rim, from which an axially outwardly annular wall 120 extends to form a seat 129 for a ring gear 122. The radial portion of the rim radially outboard of the wall 120 is provided with axially extending bolt holes 121, and the ring gear is provided with complementary, tapped bolt-receiving holes 123, into which bolts 124 are threaded to secure the ring gear to the ring gear support 117.

On its outer surface, the sleeve 118 has a cylindrical bearing receiving section 125, on which a cone 127 of a roller bearing 126 is interference fitted, an axially outward wall of which abuts a radial surface of the spider 119. A cup 128 of the bearing 126 is interference fitted into the seat 71 of the housing 66. Thus, the ring gear 122 is fixed to the spindle, against rotation, while the housing 66 is journaled for rotation on the roller bearings 111 and 126 mounted on the spindle and on the hub of the ring gear support.

The ring gear 122 is part of the planetary assembly 148, as is the sun gear 150. The assembly includes in addition three planetary gears 152, only one of which is shown. Each of the planetary gears 152 is mounted on a heavy pin 153, mounted in aligned passages 154 in axially spaced radially extending walls 155 of a planetary gear carrier 156. The pins 153 have at their axially outer ends a shoulder 187 milled chordally, and axially inboard of the shoulder, an annular seat 188, in which a retaining ring 189 is seated, to prevent axially inward movement of the pin.

Inner races 160 of ball bearings 161 are mounted on the pin 153. Outer races 162 of bearings 161 are seated in suitable seats in the planetary gears 152, as shown in FIG. 7.

The planetary gear carrier 156 has a circumferential rim 157, through which holes, spaced and sized complementarily to the tapped holes 76 opening through the face 75 of the housing, extend. Bolts 169 extend through the holes, to bolt the carrier 156 to the housing. Immediately radially inboard of the rim 157, is a hole 164, normally closed by a threaded plug 165, through which lubricating oil can be introduced to the interior of the housing. Radially inboard of the plug, the planetary gear carrier has a circular wall 158 interrupted by openings to accommodate the planetary gears 152. The wall 158 has, intermediate the planetary gears, thickened axially outer sections to receive tapped holes arranged in three groups of two, as shown more clearly in FIG. 4. The annular radial walls 155 are carried by and project radially inwardly from the wall 158, defining at their inner edges openings, the inner of which is large enough to clear the heads of the bolts 145 by which the retaining cap 140 is mounted to the end of the spindle, and the outer of which is large enough to accommodate gussets of a cover 171.

As will be observed in FIG. 7, the rim 157 of the planetary gear carrier 156 lies below the plane of the outside surface of the sprocket, and the outer surface of the radially extending wall 55 is on the order of ¼" beyond the radial surface of the sprocket.

The cover 171 is circular in plan, with flats 178 with holes in them aligned with the tapped holes in the planetary gear carrier, through which bolts 169 extend. In the center of the cover 171 is an open ended well 180, which has a shoulder 181 at its lower end to accommodate an O-ring 182. A groove in the side wall of the well 180 above the shoulder accommodates a retaining ring 183. A sight glass 175, which can be a tough, clear plastic, such as Lexan, is sandwiched snugly between the O-ring 182 and the retaining ring 183. Between the outer margin of the cover and the well 180, there is shown a magnetic plug 185. An annular channel 177 in the underside of cover 171 accommodates an O-ring 174, which bears against a flat radial surface of the outer radial wall 155 of the planetary gear carrier. Also as shown in FIG. 7, the cover has an annular recess 186 to accommodate the shoulder 187 on the outer ends of the shafts 153, to prevent shafts 153 from rotating.

Between the retaining cap 140 and the axially inner end of the sun gear 150 is a thrust washer 146. On the axially outer end of the sun gear 150 is an axial stop button 149.

Shims can be used between the axially inboard edge of the retaining cap 140 and the flat axially outer end 58 of the spindle, to adjust the thrust on the bearings 126 and 111.

The outer peripheral edge of the cover 171 is chamfered, and the cover and the head of the plug 185 project less than one and a half inches (1½″) from the plane of the outer radial side wall of the sprocket. With its chamfered edge, the cover plate offers practically no opportunity for the accumulation of mud or the accommodation of stones and the like between itself and the underside of a track being driven by the sprocket.

On the inboard side, also, the provision of the bell-shaped housing gives a smooth sloping surface that discourages lodgment of rocks or dirt. Furthermore, by making the sprocket virtually continuous over the drive ring, a relatively large bearing surface, as compared with the conventional type of sprocket and sprocket holder arrangement, is provided, which both increases the life of the sprocket, and of the grouser bars, and eliminates the problems of distortion of the conventional sprocket holder when rocks are wedged between the track and the sprocket supporting walls.

The greatly increased volume achieved by making the drive ring integral with the outer wall of a bell-shaped housing, has permitted the use of much larger gears, and larger bearings without increasing the pitch diameter of the sprocket. This not only increases the ruggedness and therefore the life of the gears, but permits a 6.6 reduction in the planetaries and a 3.8 reduction in the differential, as compared with a 3.1 reduction in the outboard planetaries and a 5.8 reduction in the differential in systems commonly used heretofore. With the same input torque, there is less stress on the gears and brakes on the controlled planetary differential. Because less reduction is required in the differential, the braking system is more effective for steering the vehicle.

The provision of the segmented sections of the drive sprockets allows the replacement of the drive sprockets without removing the tracks from the machine, and the replacement of only one segment in the event of a tooth failure in only one of the segments. With conventional sprockets, the track had to be removed, and the entire sprocket section had to be replaced if there were a failure of only one tooth.

With the provision of the sight glass in the center of the cover, an operator can tell at a glance whether there is sufficient lubricating oil in the housing.

The provision of a sun gear integral with the end of the spline shaft also adds greatly to the life of the planetary gear assembly. It has been conventional to mount a sun gear on the spline shaft by splining it. This produced a gear that was thin at the root, therefore subject to breakage.

Numerous variations within the scope of the appended claims will occur to those skilled in the art in the light of the foregoing disclosure. Merely by way of example, the sprockets can be made in more than three segments; the sprocket drive ring can be made with a configuration different from cylindrical, although the cylindrical configuration has advantages of simplicity and versatility in the mounting of the sprockets; sprockets with an axial reach across the drive ring can be used with other types of drive rings; four planetary gears can be used instead of three; the reduction of the planetaries can be made less than 6.6, although the high ratio is much to be desired. The various seals and bearings can be modified. These are merely illustrative.

Having thus described the invention, what is claimed and desired to be secured by Letters Patent is:

1. In a tracked vehicle drive train including a differential and outboard planetary gears driven by said differential, the improvement comprising an outboard planetary gear housing containing said planetary gears, said planetary gear housing having a drive ring integral with said housing said drive ring having outboard and inboard radial side surfaces and a bridging peripheral surface extending between radially outer edges of said side surfaces, and an externally undular sprocket mounted directly on said drive ring and engaging said radial and peripheral surfaces.

2. The drive train of claim 1 wherein the sprocket is made in facing sections on opposite sides of said drive ring, each having a radial part that extends radially along one radial face of said drive ring, and a transverse part that extends transversely across a portion of the peripheral surface of said drive ring and that substantially abuts the transverse part of its opposite counterpart, whereby the drive ring is substantially completely covered by said sprocket.

3. The drive train of claim 2 wherein the facing sections of the sprocket are made in a plurality of arcuate segments.

4. The drive train of claim 3 wherein the segments of one section are staggered circumferentially with respect to the segments of the other section.

5. The drive train of claim 4 wherein the sprockets are urethane.

6. The drive train of claim 2 wherein the peripheral surface of the drive ring is cylindrical and uninterrupted, a radially inner surface of the sprocket is cylindrical and a radially outer surface of said sprocket is undular.

7. The drive train of claim 1 wherein said housing is bell-shaped, with an open mouth at its axially outer end, and a planetary gear carrier is mounted on said housing at said open mouth.

8. The drive train of claim 1 wherein the sprocket has an outboard radial face, outboard axially of said outboard radial face of said drive ring, and said housing has an axially outermost portion axially outboard of said drive ring, and the outboard radial face of the sprocket extends axially beyond the axially outermost portion of said housing.

9. In a tracked vehicle drive train including a differential and outboard planetary gears driven by said differential, the improvement comprising an outboard planetary gear housing containing said planetary gears, said planetary gear housing having a drive ring integral with said housing and an externally undular sprocket mounted directly on said drive ring, said housing being bell-shaped, with an open mouth at its axially outer end, a planetary gear carrier mounted on said housing at said open mouth, and an annular cover plate mounted on said planetary gear carrier, said cover plate having a central open-ended well therein, and a sight glass mounted in said well.

10. The drive train of claim 9 herein said cover plate projects axially beyond the outboard radial face of said sprocket no more than 1½″ and its axially outer peripheral edge is chamfered.

11. In a tracked vehicle drive train including a differential and outboard planetary gears driven by said differential, the improvement comprising an outboard planetary gear housing containing said planetary gears, said planetary gear housing having a drive ring integral with said housing and an externally undular sprocket mounted directly on said drive ring, said housing being bell-shaped, with an open mouth at its axially outer end, and a planetary gear carrier mounted on said housing at said open mouth, said housing carrying a twelve tooth, 4 15/16″ pitch sprocket, the differential having a reduction of less than 5 and the outboard planetaries, a reduction of more than 5.

12. The drive train of claim 11 wherein the differential has a 3.8 reduction and the outboard planetaries, a 6.6 reduction.

13. In a vehicle drive train including a differential and outboard planetary gears driven by said differential, the improvement comprising a bell-shaped planetary gear housing having an axially outwardly opening open mouth, said housing being rotatably mounted on a fixed spindle, a ring gear holder having an axially extending collar part mounted on said fixed spindle and a radially extending part carrying a ring gear, a planetary gear carrier fixedly mounted on said housing, a roller bearing with a cone fixedly mounted on said ring gear holder collar part and engaging said radially extending part and a cup fixedly mounted in a seat in said housing, and a cover bolted to said planetary gear carrier, and a sight glass mounted in said cover.

14. The drive train of claim 13 including a sun gear formed integrally with a spline shaft operatively connected to the differential.

15. In a tracked vehicle in which a track is driven by a sprocket mounted on a drive ring with inboard and outboard radial surfaces and an outer, bridging, peripheral surface between radially outer edges of said radial surfaces, the improvement comprising said sprocket being made in facing sections, one on either side of said drive ring, each of said sections having a radially extending wall along the full reach of a radial surface of said drive ring and an axially extending transverse wall projecting across said drive ring, said axially extending wall having a free edge, the free edge of each section butting against the free edge of the axially extending wall of the facing section, completely to cover said drive ring.

16. The improvement of claim 15 wherein the sprocket is made of resiliently compressable material, and the said free edges of the axially projecting wall are tapered radially inwardly axially outwardly through at least a part of their radial extent, and mounted with butting radially outward parts of facing sections compressively loaded.

17. The improvement of claim 15 wherein each of said sections is made up of a plurality of segments.

18. The improvement of claim 17 wherein the segments of the two sections are staggered circumferentially with respect to one another.

19. The improvement of claim 15 wherein the drive ring is integral with a housing and said radially outer axially extending peripheral surface between said two radially extending side surfaces against which the radial wall of said sections bear is uninterrupted.

20. The improvement of claim 19 wherein the drive ring radially outer surface is uniformly cylindrical.

21. In a tracked vehicle drive train including a differential and outboard planetary gears driven by said differential, the improvement comprising an outboard planetary gear housing containing said planetary gears, said planetary gear housing having a drive ring integral with an outer surface of said housing, said drive ring having outboard and inboard radial side surfaces and said housing having a cylindrical surface contiguous a radially inner edge of each of said outboard and inboard radial side surfaces, said housing cylindrical surface contiguous said outboard radial drive ring surface extending axially outboardly beyond the said outboard radial surface and said housing cylindrical surface contiguous said inboard radial drive ring surface extending axially inboardly beyond said inboard radial surface, and an externally undular sprocket mounted directly on said drive ring and engaging said drive ring radial and housing cylindrical surfaces.

* * * * *